(12) United States Patent
Frants et al.

(10) Patent No.: US 10,197,687 B2
(45) Date of Patent: Feb. 5, 2019

(54) DEVICE FOR MEASURING RADIATION

(71) Applicants: Daniil Frants, New York, NY (US);
Barry Gragg, New York, NY (US);
Samuel Ashfield-Russell, Miami Beach, FL (US)

(72) Inventors: Daniil Frants, New York, NY (US);
Barry Gragg, New York, NY (US);
Samuel Ashfield-Russell, Miami Beach, FL (US)

( * ) Notice: Subject to any disclaimer, the term of this patent is extended or adjusted under 35 U.S.C. 154(b) by 0 days.

(21) Appl. No.: 15/587,766

(22) Filed: May 5, 2017

(65) Prior Publication Data
US 2018/0321398 A1   Nov. 8, 2018

(51) Int. Cl.
*G01T 1/29* (2006.01)

(52) U.S. Cl.
CPC .................. *G01T 1/2907* (2013.01)

(58) Field of Classification Search
CPC ..................................... G01T 1/2907
USPC ........................................... 250/393
See application file for complete search history.

*Primary Examiner* — Edwin Gunberg
(74) *Attorney, Agent, or Firm* — Antonio Papageorgiou; Meister Seelig & Fein LLP

(57) ABSTRACT

A tool is provided that includes: a protractor base having a plurality of markings circumferentially spaced around a semicircular perimeter of the base; and a body pivotally coupled to the protractor base at a vertex thereof, the body having a pointer extending therefrom, a radiation source seat, and an aperture, the seat and aperture configured for the source to emit radiation directionally in-line with the pointer through the aperture.

20 Claims, 4 Drawing Sheets

DEVICE FOR MEASURING RADIATION

BACKGROUND OF THE INVENTION

The present application relates to tools and more specifically tools for use in measuring certain characteristics associated with ionized radiation.

Various tools exist to measure radiation. Geiger counters, for instance, detect the ionizing events and display the results in the form of an emission rate or a total over a period of time. There are also tools to measure the radiation energy, but these are complex and expensive. Accordingly, there is a need for a device for measuring energy and other characteristics associated with radiation that is not so limited.

SUMMARY OF THE INVENTION

In one aspect, a tool is provided that includes: a protractor base having a plurality of markings circumferentially spaced around a semicircular perimeter of the base; and a body pivotally coupled to the protractor base at a vertex thereof, the body having a pointer extending therefrom, a radiation source seat, and an aperture, the seat and aperture configured for the source to emit radiation directionally in-line with the pointer through the aperture.

In at least one embodiment, the tool includes a rail for holding at least a portion of a radiation counter.

In at least one embodiment, the rail comprises a planar structure extending lengthwise from the vertex of the protractor base.

In at least one embodiment, the tool includes a cross member slidingly coupled to the rail to move lengthwise along the rail between a first end and a second end of the tool, the second end opposite the first end.

In at least one embodiment, the tool includes a plurality of pegs laterally adjustable in a direction orthogonal to the rail to accommodate counters varying in size.

In at least one embodiment, the body is pivotally coupled to the base with a recess located on one of the body and base, and a dowel located on the other of the body and base.

In at least one embodiment, the body comprises at least one recess for receiving at least one magnet.

In at least one embodiment, the body comprises a plurality of recesses, each for receiving at least one magnet.

In at least one embodiment, the recesses form a plurality of tubular structures that share a common axis and that are separated to form a slot between the tubular structures.

In at least one embodiment, the common axis is essentially orthogonal to the base.

In at least one embodiment, the aperture is in communication with the slot between the tubular structures.

In at least one embodiment, the tubular structures have a circular cross section.

In at least one embodiment, a first of the recesses is located at a top end of the body and a second of the recesses is located at a bottom end of the body.

In at least one embodiment, the recesses are configured relative to the aperture so that emissions from the source pass through a magnetic field provided by the magnets In at least one embodiment, each of the recesses has have a seat therein for the magnet.

In at least one embodiment, the markings indicate an orientation of the body relative to the base.

In at least one embodiment, the magnet is an electromagnet.

In at least one embodiment, the tool includes a controller and a motor coupled to the body, the controller and motor collectively operable to rotate the body relative to the protractor base automatically.

Additional aspects of the present invention will be apparent in view of the description that follows.

DETAILED DESCRIPTION OF THE INVENTION

Figure 1:
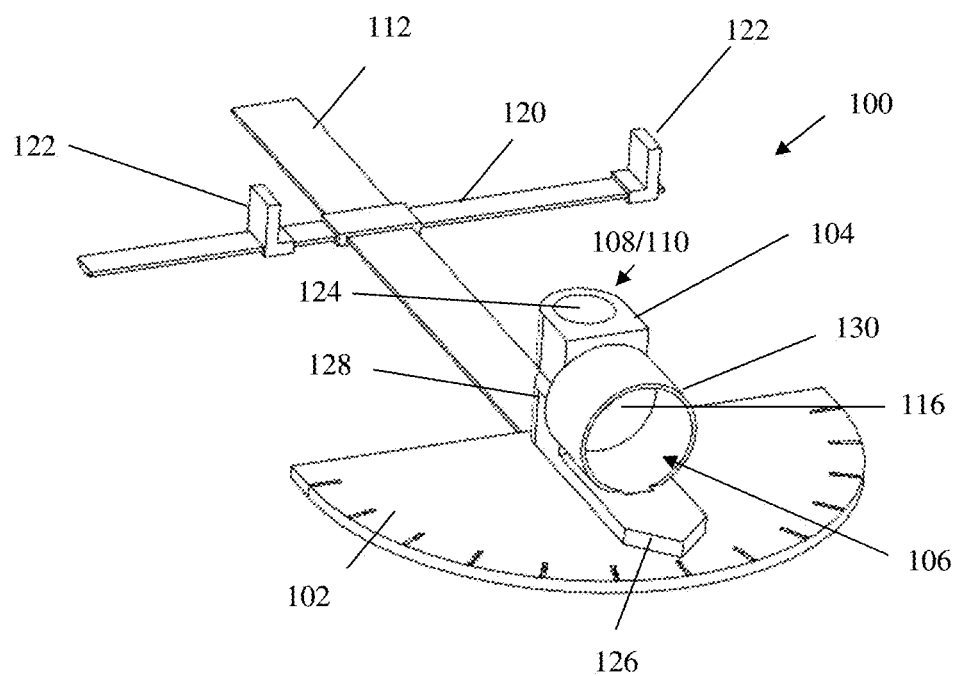
FIG. 1 is a perspective view of a device for measuring radiation according to at least one embodiment of the tools disclosed herein.

The present application generally provides a device for use in measuring certain variable associated with ionized radiation and more particularly Beta decay radiation. The tool may be used, for example, to calculate Beta particle speed and also demonstrate continuous spectrum of particle energies despite a quantized decay (neutrino+electron relationship). Various other uses are contemplated. For instance, the device may be used to determine the maximum velocity at which a radioactive source emits, e.g., Beta particles, without the use of expensive and/or complex equipment. Knowing this value allows one to calculate the maximum ionizing energy of the Beta particle, and thus to determine how dangerous exposure to a stream of similar particles would be to those nearby. Another application is to use the known value of the speed at which a radioactive source emits Beta particles in order to ascertain the strength between the two neodymium magnets. So far, there has been no accessible method to do so for a field between two such magnets. The ability to obtain this value could be very useful in a variety of applications without limitation.

The device generally includes a measuring portion that provides data that can be used to determine certain variables associated with radiation using magnetic fields. Referring to FIGS. 1-5, the tool 100 generally includes three main parts: a protractor base 102 at a first end of the tool 100, a body 104 that holds the source of radiation 106 and/or magnets 108, 110, and a rail 112 that holds at least a portion of a radiation counter (not shown), e.g., the Geiger counter, at a second end that is opposite the first end. The rail 112 generally retains the counter relative to the protractor body 102. The body 104 fits onto and is preferably pivotally coupled to the base 102, and is operable to be turned or otherwise rotated about the pivot point and/or vertex of the protractor base 102 a total of about 180 degrees. The protractor base 102 preferably includes hash marks or markings 114 spaced equally and/or extending radially from the vertex of the protractor body 102, which indicate the orientation of, in this instance, the body 104 relative to the base 102 and/or rail 112. The markings may be spaced, for example, every 15 degrees, as shown, or any other desired graduation, such as 1, 5, 10 degrees, etc.

In this regard, the tool 100 can be used to measure the direction at which the radiation source 106 disposed on the body 104 emits particles relative to the counter at the second end of the tool 100. For instance, in the orientation shown in FIG. 1, the axis of an aperture 116 in the body 104 (through which emissions pass) is aligned essentially parallel with the rail 112. In this configuration, the source emits particles through the aperture 116 in the body 104 in a direction parallel to the rail 112, toward the second end of the tool, assuming the absence of any interference on the emissions. Therefore, in this particular orientation, a counter located at the second end will receive the maximum emission from the source, i.e., the highest reading at the counter.

In at least one embodiment, the body 104 includes seats 118 for holding one or preferably a plurality of magnets 108, 110 that are located relative to the source 106 of the radiation so that emissions pass through or are otherwise affected by the magnetic field provided by the magnets 108, 110. Various magnets are contemplated, including permanent magnets and electromagnets. In this embodiment, the magnets 108, 110 deflect particles emitted from the source 106 through the aperture 116 and the counter located at the second end of the tool will no longer receive the maximum emission from the source 106. The tool 100 allows the user to rotate the body 104 about the vertex of the base 102 until the counter at the second end of the tool 100 once again receives a highest reading. In this orientation of the body 104, the measurement shown on the base 102 represents the angle of maximum flux as a result of the magnetic forces. With this information (angle) and known variables (e.g., the relativistic mass of an electron and the strength of the magnetic field) users may compute the speed/energy at which the electrons (beta particles) are emitted from the source 106 under such condition using, for example, equations for centripetal, magnetic forces, and the like.

In at least one embodiment, the tool 100 includes a controller and a servo motor that rotates the body of the device relative to the protractor base. This allows the user to manipulate the body remotely. Additionally, the controller may be programed to rotate the body through its range of motion automatically and/or vary the magnetic field, and collect therefrom information in sync with the turning of the body without human intervention.

Figure 2:
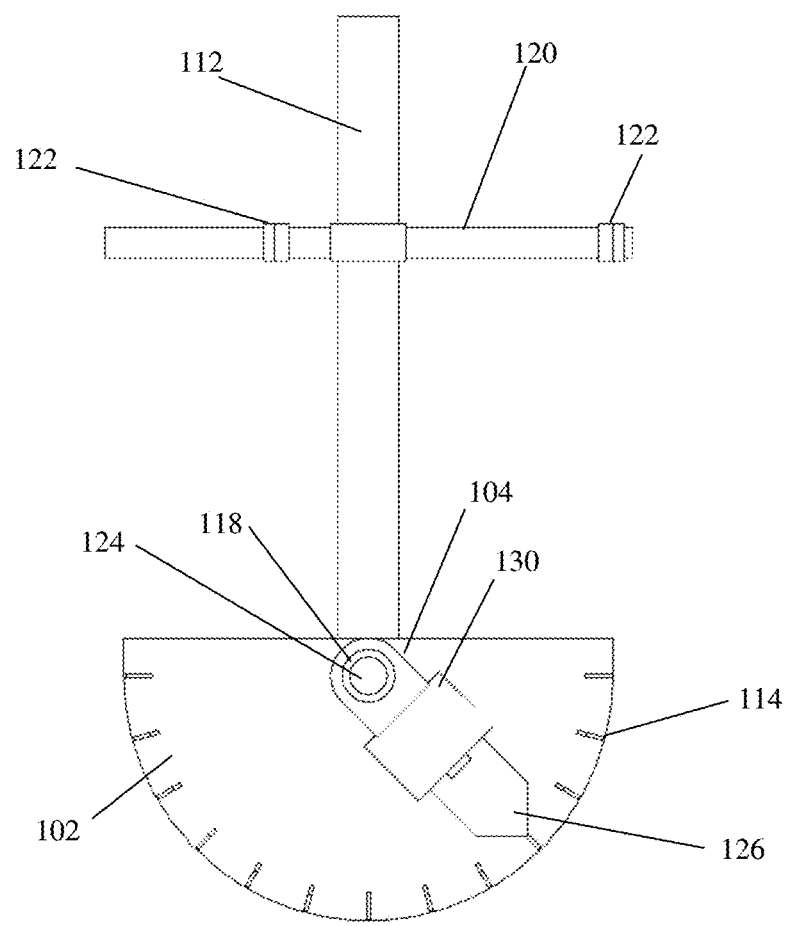
FIG. 2 is a top view of the tool according to at least one embodiment of the tools disclosed herein.
Figure 3:
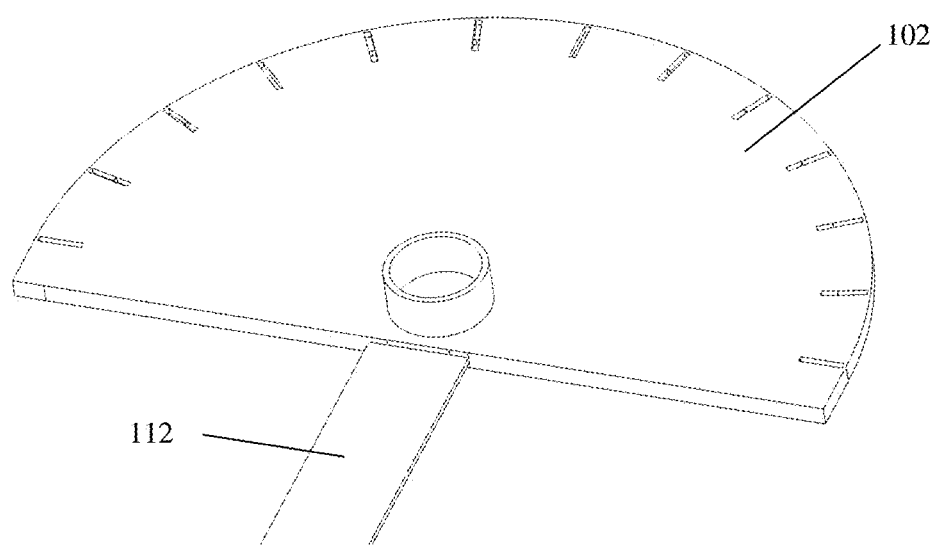
FIG. 3 is a perspective view of a protractor base of the tool according to at least one embodiment of the tools disclosed herein.

Referring to FIGS. 1-2, in at least one embodiment, the tool 100 includes a protractor base 102 pivotally coupled to a body 104 and/or a rail 112 extending in a front to back (lengthwise) direction from the base 102. The base 102 preferably has a semicircular planar structure, as shown in FIG. 3. It is understood that the pivotal connection may be achieved in a variety of ways, including a recess/dowel structure, as also shown in FIG. 3. The rail 112 may also be a planar structure extending out from the base 102 at or near the vertex of the semicircular base 102. The rail 112 may include a cross member 120 that is slidingly coupled to the rail 112 to move lengthwise between the first and second ends along the rail 112. The cross member 120 may further include one or a plurality of pegs 122 laterally adjustable in a direction orthogonal to the rail accommodate a variety of difference sized counters and/or to align the receiver of the counter with the aperture 116 in the body 104.

Figure 4:
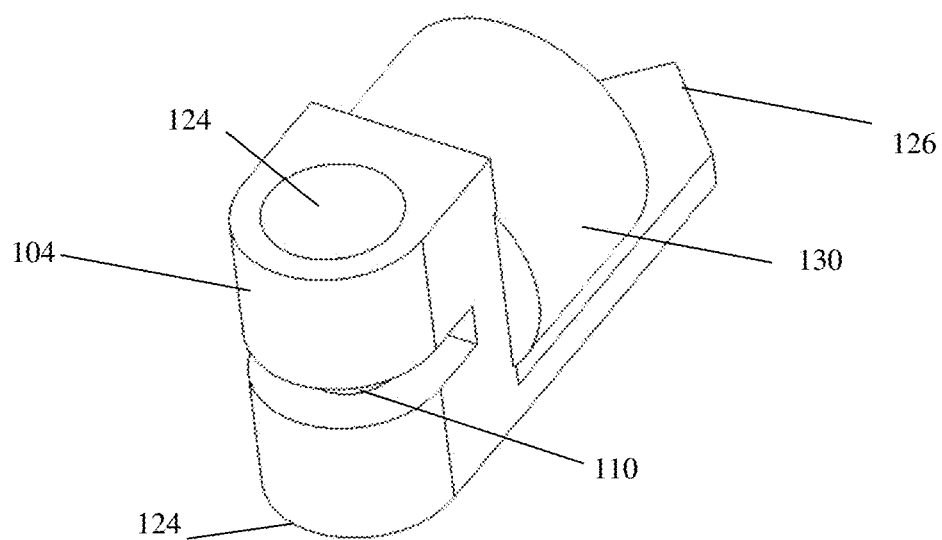
FIG. 4 is a perspective view of a body of the tool according to at least one embodiment of the tools disclosed herein.
Figure 5:
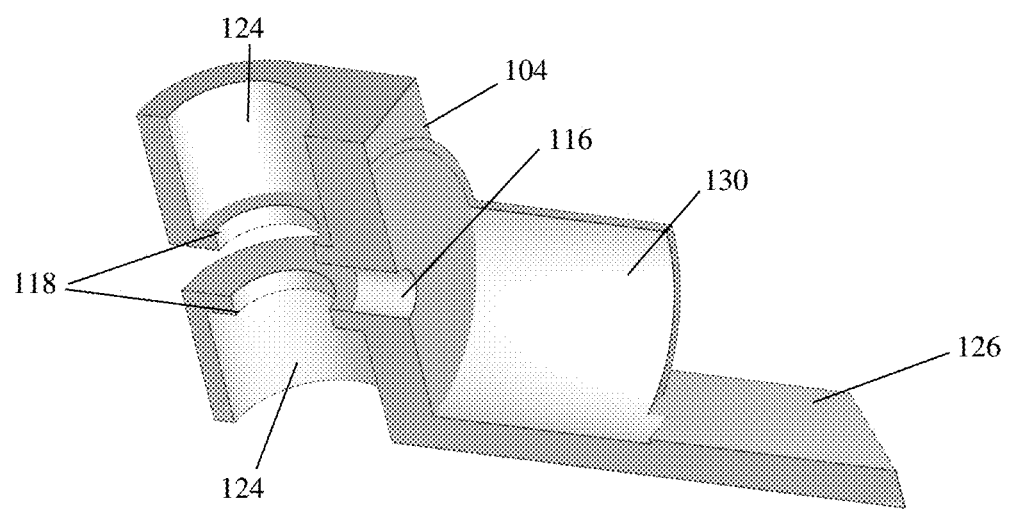
FIG. 5 is cross sectional perspective view of the body of the tool according to at lease one embodiment of the tools disclosed herein.

Referring to FIGS. 4-5, the body 104 has a structure having one or a plurality of recesses 124 therein for holding one or a plurality of magnets, respectively. The recesses preferably have a circular cross section, so that the body 104 has a plurality of structures tubular in shape. The tubular structures may be aligned vertically so as to share a common axis that is essentially orthogonal to the protractor base 102.

The plurality of structures may further be spaced apart vertically to form a gap or slot 128 in the body, as shown. In this instance, the opening for the recesses 124 may reside on opposite ends of the body 104, i.e., one on top and another on the bottom of the body 104. At the bottoms of the recesses 124 are seats 118 for the magnets 108, 110. The body 104 further includes a pointer 126 extending from the body 104 and an aperture 116 in communication with the gap 128. Finally, the body 104 includes a seat source 130 for holding the emission source, e.g., a chip containing a license exempt quantity of radioactive material in a well of a 1-inch diameter (25 mm) by ⅛-inch thick (3 mm) plastic disk. The seat 130 is located relative to the body 104 for emissions from the source to pass directionally through the aperture 116. This directionality is preferably in-line with the pointer 126.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A tool comprising:
   a protractor base having a plurality of markings circumferentially spaced around a semicircular perimeter of the base; and
   a body pivotally coupled to the protractor base at a vertex thereof, the body having a pointer extending therefrom, a radiation source seat, and an aperture, the seat and aperture configured for the source to emit radiation directionally in-line with the pointer through the aperture.

2. The tool of claim 1, comprising a rail for holding at least a portion of a radiation counter.

3. The tool of claim 2, wherein the rail comprises a planar structure extending lengthwise from the vertex of the protractor base.

4. The tool of claim 3, comprising a cross member slidingly coupled to the rail to move lengthwise along the rail between a first end and a second end of the tool, the second end opposite the first end.

5. The tool of claim 4, comprising a plurality of pegs laterally adjustable in a direction orthogonal to the rail to accommodate counters varying in size.

6. The tool of claim 1, wherein the body is pivotally coupled to the base with a recess located on one of the body and base, and a dowel located on the other of the body and base.

7. The tool of claim 1, wherein the body comprises at least one recess for receiving at least one magnet.

8. The tool of claim 7, wherein the body comprises a plurality of recesses, each for receiving at least one magnet.

9. The tool of claim 8, wherein the recesses form a plurality of tubular structures that share a common axis and that are separated to form a slot between the tubular structures.

10. The tool of claim 9, wherein the common axis is essentially orthogonal to the base.

11. The tool of claim 9, wherein the aperture is in communication with the slot between the tubular structures.

12. The tool of claim 11, wherein the tubular structures have a circular cross section.

13. The tool of claim 8, wherein a first of the recesses is located at a top end of the body and a second of the recesses is located at a bottom end of the body.

14. The tool of claim 8, wherein the recesses are configured relative to the aperture so that emissions from the source pass through a magnetic field provided by the magnets.

15. The tool of claim 7, wherein each of the recesses have a seat therein for the magnet.

16. The tool of claim 7, wherein the markings indicate an orientation of the body relative to the base.

17. The tool of claim 7, wherein the magnet is an electromagnet.

18. The tool of claim 1, comprising a controller and a motor coupled to the body, the controller and motor collectively operable to rotate the body relative to the protractor base automatically.

19. A tool comprising:
   a protractor base having a plurality of markings circumferentially spaced around a semicircular perimeter of the base; and
   a body pivotally coupled to the protractor base at a vertex thereof, the body having a pointer extending therefrom, a radiation source seat, an aperture, and a plurality of recesses forming a plurality of tubular structures with a slot between the tubular structures, each of the structures receiving at least one magnet, the seat and aperture configured for the source to emit radiation directionally in-line with the pointer through the aperture that is in communication with the slot between the tubular structures.

20. The tool of claim 19, wherein the tubular structures share a common axis that is essentially orthogonal to the base.

* * * * *